(12) United States Patent
Alizon et al.

(10) Patent No.: US 8,808,898 B2
(45) Date of Patent: Aug. 19, 2014

(54) BATTERY PACK FOR AN ELECTRIC POWERTRAIN VEHICLE

(75) Inventors: Franck M. Alizon, Verneuil sur Seine (FR); Caroline Marchal, Montigny le Bretonneux (FR); Didier M. Deruy, Vanves (FR)

(73) Assignee: Renault S.A.S., Boulogne (FR)

( * ) Notice: Subject to any disclaimer, the term of this patent is extended or adjusted under 35 U.S.C. 154(b) by 330 days.

(21) Appl. No.: 12/958,444

(22) Filed: Dec. 2, 2010

(65) Prior Publication Data
US 2011/0189524 A1  Aug. 4, 2011

Related U.S. Application Data

(60) Provisional application No. 61/299,413, filed on Jan. 29, 2010.

(51) Int. Cl.
*H01M 10/50* (2006.01)

(52) U.S. Cl.
CPC ...... *H01M 10/5046* (2013.01); *H01M 10/5044* (2013.01)
USPC .......................................................... 429/120

(58) Field of Classification Search
None
See application file for complete search history.

(56) References Cited

U.S. PATENT DOCUMENTS

| 5,756,227 | A | 5/1998 | Suzuki et al. | |
|---|---|---|---|---|
| 6,512,347 | B1 | 1/2003 | Hellmann et al. | |
| 6,709,783 | B2 * | 3/2004 | Ogata et al. | 429/120 |
| 6,818,343 | B1 | 11/2004 | Kimoto et al. | |
| 7,896,063 | B2 * | 3/2011 | Shimoyama | 165/121 |
| 8,153,290 | B2 * | 4/2012 | Hermann et al. | 429/120 |
| 2002/0028375 | A1 * | 3/2002 | Morishita et al. | 429/120 |
| 2003/0017384 | A1 * | 1/2003 | Marukawa et al. | 429/120 |
| 2007/0141453 | A1 | 6/2007 | Mahalingam et al. | |
| 2009/0142628 | A1 | 6/2009 | Okada et al. | |

FOREIGN PATENT DOCUMENTS

| EP | 1 143 541 A1 | 10/2001 |
|---|---|---|
| EP | 1 278 263 A2 | 1/2003 |
| EP | 2 065 963 A2 | 6/2009 |
| WO | WO 2007/082863 A1 | 7/2007 |
| WO | WO 2009/103526 A1 | 8/2009 |
| WO | WO 2009/128220 A1 | 10/2009 |

OTHER PUBLICATIONS

Rohsenow, Warren M.; Hartnett, James P.; Cho, Young I. (1998). Handbook of Heat Transfer (3rd Edition).. McGraw-Hill. Online version available at: http://www.knovel.com/web/portal/browse/display?_EXT_KNOVEL_DISPLAY_bookid=1626&VerticalID=0.*
European Search Report issued Jul. 12, 2010 in EP Application No. 10 30 5099.

* cited by examiner

*Primary Examiner* — Milton I Cano
*Assistant Examiner* — Wojciech Haske
(74) *Attorney, Agent, or Firm* — Oblon, Spivak, McClelland, Maier & Neustadt, L.L.P.

(57) ABSTRACT

A battery pack includes at least a first stack of battery modules, and a second stack of battery modules, each stack including a plurality of battery modules arranged in parallel in side by side relationship extending in a longitudinal direction, the battery pack further including at least one heat exchanger interposed between the first and second stacks, the heat exchanger being in thermal contact with interstack coupling surfaces extending in a longitudinal and transversal plan [L-T] of the battery modules. The invention also relates to a corresponding heat exchanger.

10 Claims, 3 Drawing Sheets

BATTERY PACK FOR AN ELECTRIC POWERTRAIN VEHICLE

FIELD OF THE DISCLOSURE

The present disclosure relates to a heat exchanger for cooling a battery pack of an electric or hybrid vehicle and to a battery pack arrangement with such a heat exchanger.

BACKGROUND OF THE DISCLOSURE

Vehicles with at least an electric powertrain, such as electric vehicles or hybrid vehicles, carry a battery pack composed of an array of closely positioned modules, each module being in series with one another, to provide a combined energy of desired level.

To be more compact, to improve energy storage density and to adapt to some particular geometrical spaces, some battery packs comprise a plurality of arrays, or stacks of modules.

During operation, when some electrical energy is transferred in or out from the stacks of modules, during charge and discharge cycles, some heat is produced by the chemical reactions that take place within the modules.

For optimized performance and sustained longevity, the modules have to be maintained during operation in a predetermined operating temperature range, and the temperature difference between each module needs to be as little as possible.

It is a problem with the battery pack known from the prior art, to ensure that these requirements are fulfilled for all the modules, especially when the battery packs become large and comprise a large number of modules.

It is a general object of the invention to provide a battery pack with an improved temperature control and a pack in which the heat transfer from the modules is enhanced.

SUMMARY OF THE INVENTION

Thereto, the present invention provides a battery pack comprising at least a first stack of battery modules and a second stack of battery modules each stack comprising a plurality of battery modules arranged in parallel in side by side relationship extending in a longitudinal direction, said battery pack further comprising at least one heat exchanger interposed between the first and second stacks, said heat exchanger being in thermal contact with interstack coupling surfaces extending in a longitudinal and transversal plan [L-T] of the battery modules.

According to one aspect of the invention, the battery pack comprises a heat exchanger with a first plate connected to the second interstack coupling surface of the battery modules of the first stack, and a second plate connected to the first interstack coupling surface of the modules of second stack, and a plurality of fins that connect the first and the second plates to each other, defining fluid flow ducts.

The heat exchanger can have plates with a rectangular shape and that extend in a longitudinal and transversal plan [L-T] and fins that extend in vertical and transversal plans [V-T]. Therefore, the fluid flow ducts extend in the transversal direction T.

According to another aspect of the invention, the heat exchanger plates can be in indirect contact with the interstack coupling surfaces of the battery modules of the stacks through a thermal bridge.

The thermal bridge can comprise thermal grease chosen among ceramic-base, metal-base, Carbon, Liquid metal, or silicone thermal greases. Alternatively, the thermal bridge can comprise an elastomer pad, preferably a silicone rubber pad.

According to yet another aspect of the invention, the heat exchanger plates can be in direct contact with the interstack coupling surfaces of the battery modules of the stacks.

Thus, the heat exchanger can comprise ridges adapted to receive the lips of the battery module case for allowing the heat exchanger plates to get into contact with the interstack coupling surfaces of the battery modules.

Further, the battery pack according to the invention can have a plurality of fluid flow ducts that are formed in the vicinity of each interstack coupling side face of the battery modules.

In addition, the battery pack can have at least one fluid flow duct located at a position where it can match in part with one interstack coupling side face of a consecutive battery module of the stack.

The invention also provides a heat exchanger for use in a battery pack comprising at least a first stack of battery modules, and a second stack of battery modules, each stack comprising a plurality of battery modules arranged in parallel in side by side relationship extending in a longitudinal direction L, said heat exchanger being adapted to be disposed between the first and second stacks, and to be in thermal contact with interstack coupling surfaces extending in a longitudinal and transversal plan [L-T] of the battery modules.

According to another aspect, the heat exchanger can comprise a first plate adapted to be in contact with the second interstack coupling surface of the battery modules of the first stack and a second plate adapted to be in contact with the first interstack coupling surface of the modules of second stack, and a plurality of fins that connect the first and the second plates to each other, defining fluid flow ducts that extend in the transversal direction T.

Further, the heat exchanger can have plates with ridges adapted to receive the lips of the battery module case for allowing the heat exchanger plates to get into contact with the interstack coupling surfaces of the battery modules.

According to another aspect, the heat exchanger can be obtained by an extrusion or a pultrusion molding process.

The various aspects, features and advantages of the disclosure will become more fully apparent to those having ordinary skill in the art upon careful consideration of the following detailed description, given by way of example thereof, with the accompanying drawings described below:

DETAILED DESCRIPTION

In the following description, the longitudinal, vertical and transversal directions will be adopted in a non-limitative way, according to a trihedron L,V,T represented on the figures.

Figure 1:
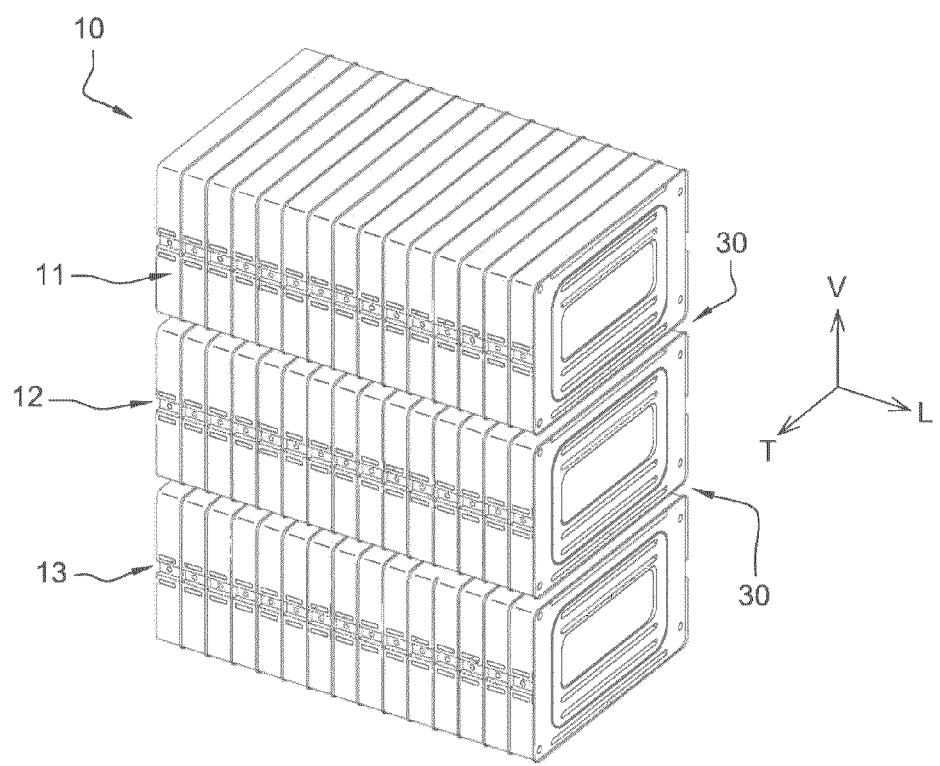
FIG. 1 shows a perspective view of an arrangement of three stacks of modules according to the invention.
Figure 2:
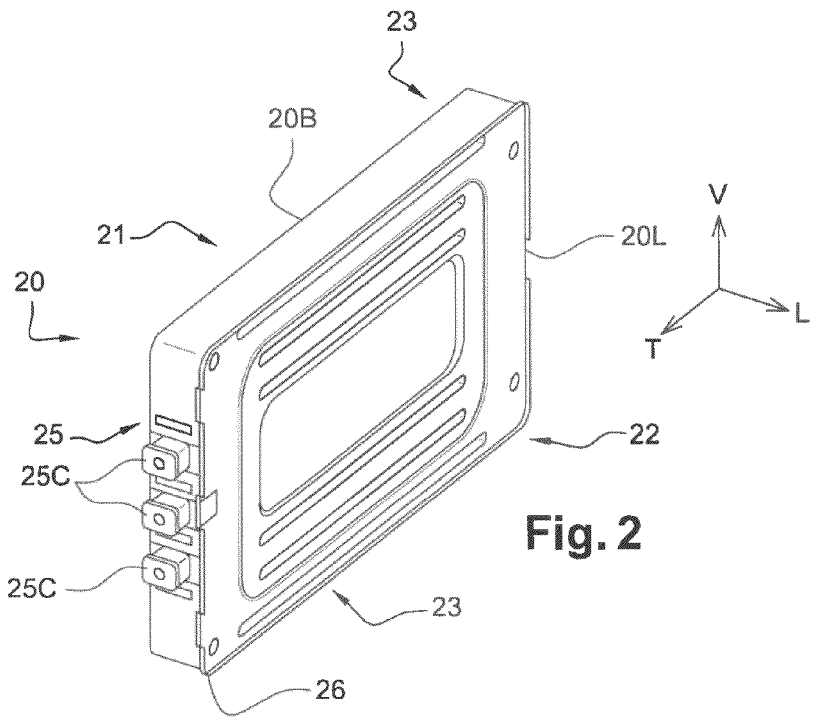
FIG. 2 shows a perspective view of a single module according to the invention.

Referring to the figures and for the moment in particular to FIG. 1 and FIG. 2, three stacks 11,12,13 of modules 20 are piled on each other to form a block that is adapted to be disposed in a housing (not shown) to form a battery pack suitable for use in an electric or hybrid vehicle. These three stacks 11,12,13 are separated by two heat exchangers 30.

Each battery stack 11,12,13 comprises a plurality of battery modules 20 arranged in a side by side relationship and generally extending in the longitudinal direction L. The number of battery modules 20 of each battery stack 11,12,13 is selected in view of output characteristics needed by battery pack.

As shown on FIG. 2, the battery modules 20 comprise a parallelepiped case that includes a bottom case part 20B shaped like a rectangular pan and a flat rectangular lid part 20L. Four corners of flat rectangular lid part 20L that extends in a vertical and transversal plan [V-T] are fixed to corresponding four corners of bottom case part 20B by means of caulking.

The battery modules 20 comprise first 21 and second 22 intermodule coupling side faces opposed to each other and that extend in a vertical and transversal plan [V-T]. The battery modules 20 also comprise first 23 and second 24 interstack coupling side faces opposed to each other and that extend in the longitudinal and transversal plan [L-T].

As shown on FIG. 2, the first intermodule coupling side face 21, and the first 23 and second 24 interstack coupling sides are located on the bottom case part 20B, and the second intermodule coupling side 22 is located on the flat rectangular lid part 20L.

That is, the first 23 and second 24 interstack coupling side faces are suitable to couple two stacks in the vertical direction V and the first 21 and second intermodule coupling sides are suitable to couple two consecutive modules with each other in the longitudinal direction L.

Within the rectangular case 20B,20L, there are intimately installed a plurality of elementary cells connected in series in which chemical reactions arise to produce electrical energy. Preferably, the elementary cells are flat type lithium-ion batteries that are formed by accommodating electromotive elements consisting of laminated positive and negative electrode plates with separators interposed therebetween. The elementary cells are hermetically sealed in a flat packaging member made of a laminated film or the like.

The elementary cells are in thermal contact, by convection and/or convection with the battery module case 20B,20L.

Referring back to FIG. 2, bottom case part 20B and flat rectangular lid part 20L are each preferably constructed of a thin steel plate or aluminum plate. By using such materials, heat transfer between the battery modules 20 in the longitudinal direction L, is improved through the coupling of first 21 and second 22 intermodule coupling complementary side faces of consecutive modules 20. Other materials having a suitable heat transfer coefficient could be used such as aluminum alloy or copper.

The caulking process for sealing the flat rectangular lid part 20L on the bottom case part 20B produces an external lip 26 on the periphery of the second 22 intermodule coupling side face, that permits the first intermodule coupling side face 21 to be adjusted and centered when two consecutive modules 20 are coupled with each other in a stack 11,12,13.

The modules 20 of a stack 11,12,13 are tied together by a frame construction (not shown), that applies sufficient pressure on the battery modules 20 for the respective first 21 and second 22 intermodule side faces to be pressed against each other and have a good coupling.

As is seen from FIG. 2, each battery module 20 is equipped with electrical output terminals 25C located on a non-coupling side 25 that extends in the longitudinal and vertical plan [L-V]. These output terminals 25C are connected to the elementary cells contained in the battery module 20 by hermetically sealed through holes made in the bottom case part 203.

Figure 3:
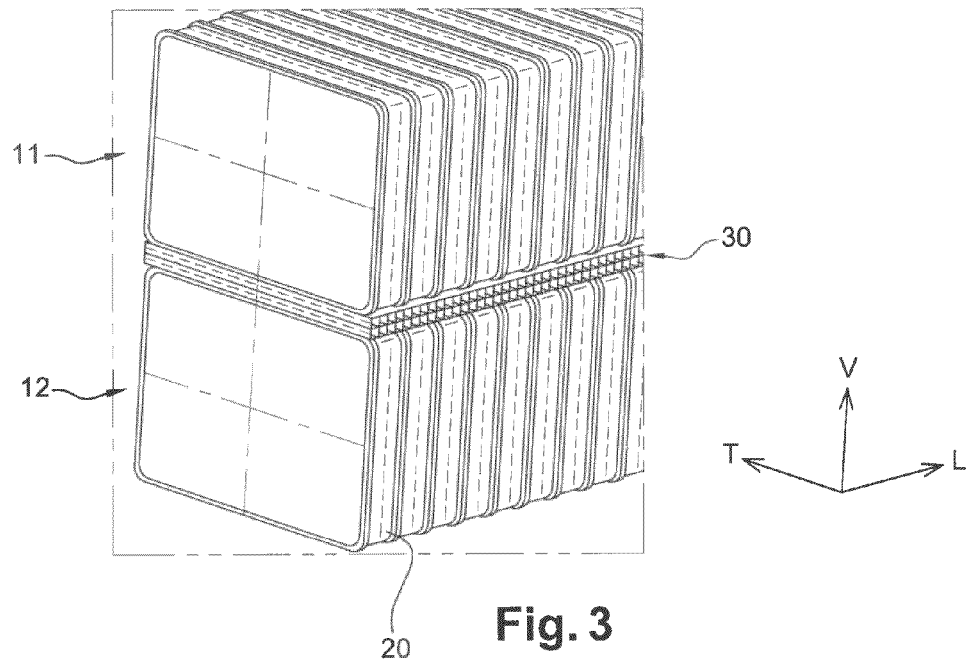
FIG. 3 depicts a perspective view of two stacks of modules spaced away from each other by a heat exchanger according to the invention.

FIG. 3 depicts a heat exchanger 30 sandwiched between the first 11 and second 12 stacks of battery modules 20 and that extends generally along the longitudinal and transversal plan [L-T].

The heat exchanger 30 is directly or indirectly thermally connected to the stacks 11, 12 of modules 20. More precisely, the heat exchanger 30 is thermally connected to the first 23 and second 24 interstack coupling side faces of the battery modules 20.

Transferring heat through these side faces 23, 24 provides for an enhanced homogeneity of the cooling of the battery modules 20 within the same stack as well as between two consecutive stacks.

First Embodiment

A heat exchanger with its plates indirectly thermally connected with the battery modules by a thermal bridge.

Figure 4:
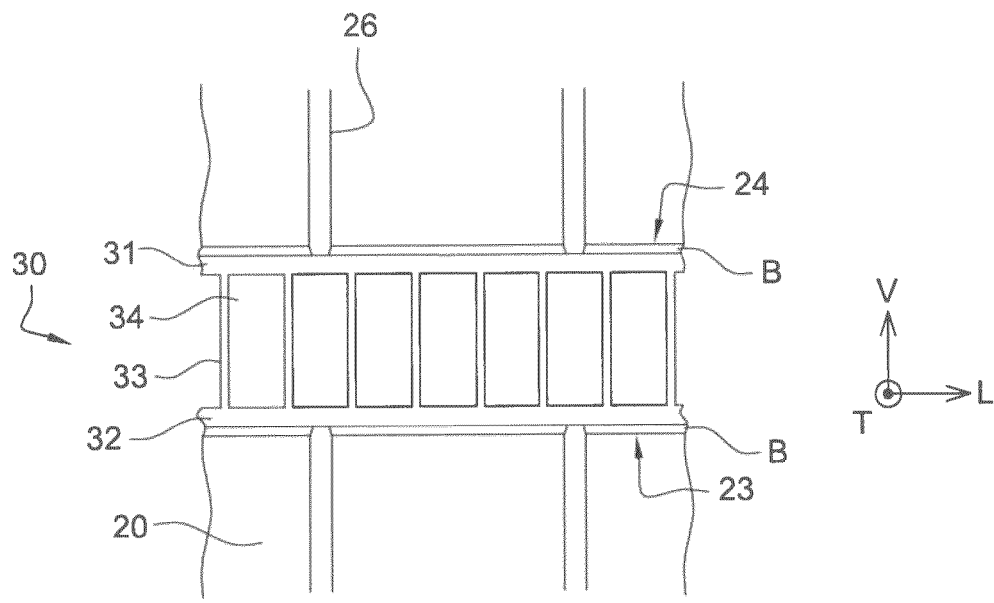
FIG. 4 is a frontal view of the heat exchanger arrangement with the stack of modules according to a first embodiment of the invention.
Figure 5:
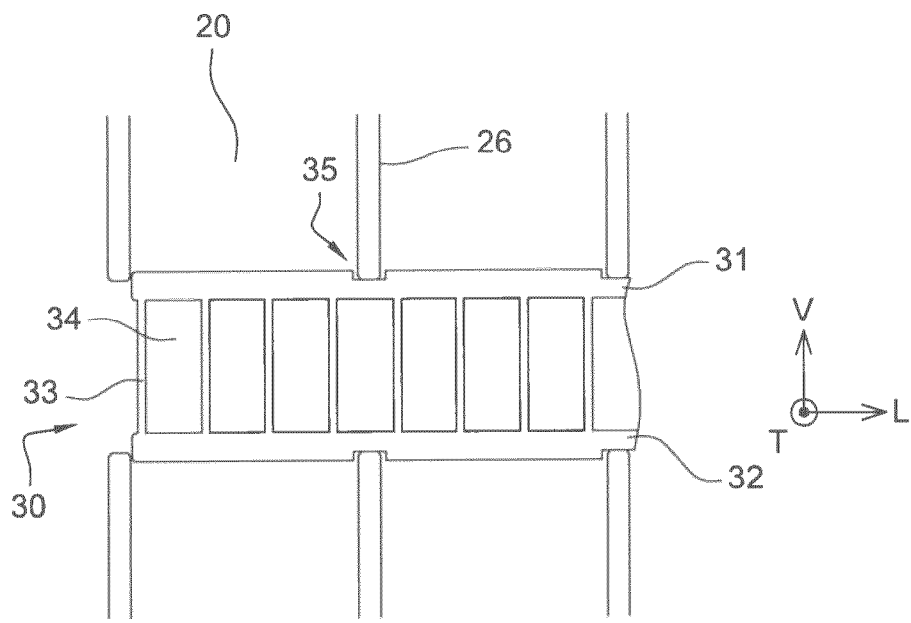
FIG. 5 is a frontal view of the heat exchanger arrangement with the stack of modules according to a second embodiment of the invention.

FIG. 4 depicts the heat exchanger 30 arrangement located in between the first 11 and second 12 stack of battery modules 20 according to a first embodiment of the invention.

The heat exchanger 30 comprises a first plate 31 indirectly thermally connected to the battery modules of the first stack 11 and a second plate 32 indirectly thermally connected to the battery modules 20 of the second stack 12.

The plates 31,32 have a rectangular shape and extend in a plan that extends longitudinally and transversally [L-T].

A plurality of fins 33 connect the first 31 and the second 32 plates to each other. The fins 33 extend vertically and transversally according to plans that are parallel to the vertical and transversal plan [V-T].

Thus, these fins 33 and plates 31,32 form a plurality of fluid flow ducts 34 in which a fluid, such as air can flow through, in the transversal direction T.

Having the fluid flow ducts 34 extending along the transversal direction T, provides for an important surface of heat exchange between the heat exchanger 30 and the interstack coupling side faces 23,24 of the battery modules 20 while not affecting the compactness of the stacks 11,12,13.

Further, battery modules 20 located at different places in the stack 11,12,13 are in contact with a fluid that is approximately at the same temperature. That is, the fluid flowing in a fluid flow duct 34 is not warmed up by the heat of neighboring battery modules 20.

Preferably, a plurality of fluid flow ducts 34 are formed to match with each interstack coupling side face 23, 24 of the battery modules 20.

More preferably, a number comprised between three and five fluid flow ducts 34 are formed in the vicinity of each interstack coupling side face 23,24 of the battery modules 20.

Even more preferably, at least one fluid flow duct 34 is located at a position where it can match in part with one interstack coupling side face 23,24 of a consecutive battery module 20. This way at least one duct 34 is in thermal contact with two consecutive battery modules 20, thereby reducing the temperature difference between consecutive battery modules 20.

Such arrangement provides for a good homogeneity of the temperature between the battery modules 20 within one stack as well as between two stacks.

Moreover, heat exchange arises also between two neighboring fluid flow ducts 34, through the fins 33, thus contributing to improve the homogeneity of the temperatures of the battery modules 20.

According to the first embodiment of the invention, the plates 31, 32 are indirectly thermally connected with the interstack coupling surfaces 23,24 of the battery modules 20 by a thermal bridge B.

This thermal bridge B can comprise a thermal grease chosen in a non limitative list among ceramic-base, metal-base, Carbon, Liquid metal, or silicone thermal greases.

Alternatively, the thermal bridge B can comprise an elastomer or rubber pad, such as a pad made of silicone rubber.

This thermal bridge B enhances the heat transfer between the plates 31,32 and the interstack coupling surfaces 23,24, that can be disrupted by some imperfections in the matching of the surfaces and plates, for example consecutive to some swelling of the battery modules 20.

This first embodiment of the heat exchanger is particularly attractive for use with the modules 20 described herebefore, in which a lip 26 protrudes from the battery module case 20B,20L due to the construction of the case by caulking.

The heat exchanger 30 can be obtained by an extrusion or a pultrusion molding process.

Second Embodiment

A heat exchanger with its plates directly thermally connected with the battery modules by a thermal bridge.

In a second embodiment of the invention, the plates 31,32 are connected directly with the interstack coupling side faces 23,24 of the battery modules 20.

According to this second embodiment, the surface treatment of the plates 31,32 and of the interstack coupling side faces 23,24 are optimized to have a perfect matching contact on a surface as large as possible in order to enhance heat transfer and prevent a high resistivity fluid such as air to fill in the space between the plates 31,32 and side faces 23,24.

For these surfaces to apply on each other, ridges 35 are formed in the plates 31,32 to match with the lip 26 locations on the battery module 20. Thus, the lips 26 are received within these ridges 35 so that the heat exchanger plates 31,32 get into contact with the interstack coupling surfaces 23,24 of the battery modules 20.

The heat exchanger according to the second embodiment is particularly simple to make, since the ridges 35 can be formed on the heat exchanger 30 during the extrusion or protrusion molding process. Alternatively, the ridges 35 can be engraved in the heat exchanger 30 after molding.

The heat exchanger according to this embodiment can prevent use of a thermal bridge between the surfaces of contact.

The heat exchangers 30 of the first and second embodiments are particularly advantageous when the case 20B,20L of the battery modules 20 suffers from swelling, since the swelling is less significant on the interstack coupling side faces 23,24 than on the intermodule coupling side faces 21,22.

While the present disclosure and the best modes thereof have been described in a manner establishing possession by the inventors and enabling those of ordinary skill to make and use the same, it will be understood and appreciated that there are equivalents to the exemplary embodiments disclosed herein and that modifications and variations may be made thereto without departing from the scope and spirit of the disclosure, which is to be limited not by the exemplary embodiments but by the appended claims.

In particular, a combination of the heat exchanger of the first embodiment can be combined with heat exchanger of the second embodiment, so that the heat exchanger comprises ridges and a thermal bridge on its surfaces.

The invention claimed is:

1. A battery pack, comprising:
 a first stack of battery modules including a first plurality of battery modules arranged in parallel in side by side relationship extending in a longitudinal direction, and each battery module of the first stack includes a top interstack coupling surface and a bottom interstack coupling surface that extend in a transverse and longitudinal plane, and a first intermodule coupling side face and a second intermodule coupling side face that extend in a vertical and transverse plane;
 a second stack of battery modules including a second plurality of battery modules arranged in parallel in side by side relationship extending in the longitudinal direction, and each battery module of the second stack includes a top interstack coupling surface and a bottom interstack coupling surface that extend in the transverse and longitudinal plane, and a first intermodule coupling side face and a second intermodule coupling side face that extend in the vertical and transverse plane; and
 at least one heat exchanger including a first plate and a second plate, the heat exchanger being located below the first stack in a vertical direction and above the second stack in the vertical direction such that said heat exchanger is in thermal contact with the top interstack coupling surface of the battery modules of the second stack and the bottom interstack coupling surface of the battery modules of the first stack,
 wherein each of the battery modules of the first stack includes a case with a lip, and the first plate of the heat exchanger comprises ridges adapted to receive the lips of the battery module cases of the first stack such that the first plate is in direct contact with the bottom interstack coupling surface of each of the battery modules of the first stack, and
 wherein each of the battery modules of the second stack includes a case with a lip, and the second plate of the heat exchanger comprises ridges adapted to receive the lips of the battery module cases of the second stack such that the second plate is in direct contact with the top interstack coupling surface of each of the battery modules of the second stack.

2. The battery pack of claim 1, wherein the heat exchanger comprises a plurality of fins that connect the first and the second plates to each other, defining fluid flow ducts.

3. The battery pack of claim 2, wherein a plurality of the fluid flow ducts are formed in a vicinity of the bottom interstack coupling surface of each of the battery modules of the first stack.

4. The battery pack of claim 3, wherein at least one of the fluid flow ducts is located at a position in thermal contact with two adjacent surfaces of the bottom interstack coupling surfaces of the battery modules of the first stack.

5. The battery pack of claim 2, wherein the plates have a rectangular shape and extend in the longitudinal and transversal plane.

6. The battery pack of claim 2, wherein the fins extend in the vertical and transversal plane.

7. The battery pack of claim 1, wherein the lip of each of the battery module cases of the first stack is located on a periphery of the second intermodule coupling side face.

8. The battery pack of claim 1, wherein the lip of each of the battery module cases of the second stack is located on a periphery of the second intermodule coupling side face.

9. A heat exchanger for use in a battery pack that includes at least a first stack of battery modules and a second stack of battery modules, each stack comprising a plurality of battery modules arranged in parallel in side by side relationship extending in a longitudinal direction, said heat exchanger comprising:

a first plate adapted to be in thermal contact with a bottom interstack coupling surface of the battery modules of the first stack such that the first stack is positioned above the first plate in a vertical direction;

a second plate adapted to be in thermal contact with a top interstack coupling surface of the battery modules of second stack such that the second stack is positioned below the second plate in the vertical direction; and a plurality of fins that connect the first and the second plates to each other, defining fluid flow ducts that extend in a transversal direction, wherein the first and second plates of the heat exchanger extend in a longitudinal and transversal plane of the battery modules, wherein each of the battery modules of the first stack includes a case with a lip, and the first plate of the heat exchanger comprises ridges adapted to receive the lips of the battery module cases of the first stack such that the first plate is in direct contact with the bottom interstack coupling surface of each of the battery modules of the first stack, and wherein each of the battery modules of the second stack includes a case with a lip, and the second plate of the heat exchanger comprises ridges adapted to receive the lips of the battery module cases of the second stack such that the second plate is in direct contact with the top interstack coupling surface of each of the battery modules of the second stack.

10. The heat exchanger of claim 9, wherein the heat exchanger is obtained by an extrusion or a pultrusion molding process.

* * * * *